United States Patent
Jiang et al.

(10) Patent No.: US 12,443,785 B1
(45) Date of Patent: Oct. 14, 2025

(54) PLACING HARD MACROS USING MACHINE LEARNING PREDICTIONS TRAINED ON DIFFERENT CIRCUIT DESIGNS

(71) Applicant: Synopsys, Inc., Mountain View, CA (US)

(72) Inventors: Yi-Min Jiang, Campbell, CA (US); Xiang Gao, San Jose, CA (US); Lixin Shao, Sunnyvale, CA (US); Pedja Raspopovic, Cary, NC (US)

(73) Assignee: Synopsys, Inc., Sunnyvale, CA (US)

( * ) Notice: Subject to any disclaimer, the term of this patent is extended or adjusted under 35 U.S.C. 154(b) by 594 days.

(21) Appl. No.: 17/953,110

(22) Filed: Sep. 26, 2022

Related U.S. Application Data (60) Provisional application No. 63/248,953, filed on Sep. 27, 2021.

(51) Int. Cl.
*G06F 30/398* (2020.01)
*G06F 30/31* (2020.01)
*G06F 30/392* (2020.01)

(52) U.S. Cl.
CPC ............ *G06F 30/398* (2020.01); *G06F 30/31* (2020.01); *G06F 30/392* (2020.01)

(58) Field of Classification Search
CPC .......... G06F 30/30; G06F 30/32; G06F 30/31; G06F 30/33; G06F 30/398; G06F 30/392; G06F 30/394; H10D 89/10
USPC ........................................................ 716/119
See application file for complete search history.

(56) References Cited

U.S. PATENT DOCUMENTS

2009/0089726 A1* 4/2009 Heng .................... G06F 30/398
716/119

OTHER PUBLICATIONS

Cheng, W-K. et al. "Machine Learning Techniques for Building and Evaluation of Routability-Driven Macro Placement." IEEE International Conference on Consumer Electronics—Taiwan (ICCE-TW), May 20-22, 2019, pp. 1-2.

Coulston, J. W. et al. "Approximating Prediction Uncertainty for Random Forest Regression Models." Photogrammetric Engineering & Remote Sending, vol. 82, No. 3, Mar. 2016, pp. 189-197.

Shahhosseini, M. et al. "Optimizing Ensemble Weights and Hyperparameters of Machine Learning Models for Regression Problems." Machine Learning with Applications, vol. 7, Mar. 15, 2022, pp. 1-10.

* cited by examiner

*Primary Examiner* — Paul Dinh
(74) *Attorney, Agent, or Firm* — Fenwick & West LLP (57) ABSTRACT

In one aspect, QoR metrics for different candidate macro placements are estimated using machine learning models. A set of candidate macro placements of hard macros within a circuit design is assessed by estimating a quality metric for each candidate macro placement, as follows. Model-specific estimates of the quality metric are predicted by applying different machine learning models to the candidate macro placements. The different machine learning models are trained using sets of completed macro placements for other circuit designs. The model-specific estimates of the quality metric are combined based on an applicability of (a) the set of macro placements used to train that model to (b) the set of candidate macro placements being evaluated.

20 Claims, 7 Drawing Sheets
(2 of 7 Drawing Sheet(s) Filed in Color)

PLACING HARD MACROS USING MACHINE LEARNING PREDICTIONS TRAINED ON DIFFERENT CIRCUIT DESIGNS

RELATED APPLICATION

This application claims priority under 35 U.S.C. § 119(e) to U.S. Provisional Patent Application Ser. No. 63/248,953, "Congestion and Timing Aware Macro Placement Using Machine Learning Predictions from Different Data Sources," filed Sep. 27, 2021. The subject matter of all of the foregoing is incorporated herein by reference in their entirety.

TECHNICAL FIELD

The present disclosure relates to the physical design of integrated circuits in general and more specifically to the placement of hard macros using machine learning models to predict target metrics for candidate placements.

BACKGROUND

The physical design of an integrated circuit includes many stages, including floor planning, placement, routing, and so on. One of the stages of the physical design process is the placement of hard macro cells. Macro cells are larger blocks of circuitry within a circuit design that are typically larger than standard cells. Examples of macro cells include memory, USB and other I/O blocks. In contrast, examples of standard cells include logic gates, registers, and multiplexers. Hard macros are macro cells that have been reduced to a physical layout. Hard macros therefore have a defined size and shape.

Macro cell placement is the process of placing hard macros within the layout of the integrated circuit, with one goal being to optimize the QoR (quality of results) of the integrated circuit. Macro cell placement is generally performed in early stages in the physical design flow. The placement of macro cells can have a large impact on the final QoR of the integrated circuit. However, QoR metrics typically are calculated only later in the physical design flow. As a result, if the selected macro placement results in poor QoR, changing the macro placement will require repeating significant portions of the design flow.

SUMMARY

In one aspect, QoR metrics for different candidate macro placements are estimated using machine learning models. A set of candidate macro placements of hard macros within a circuit design is assessed by estimating a quality metric for each candidate macro placement, as follows. Model-specific estimates of the quality metric are predicted by applying different machine learning models to the candidate macro placements. The different machine learning models are trained using sets of completed macro placements for other circuit designs. The model-specific estimates of the quality metric are combined based on an applicability of (a) the set of macro placements used to train that model to (b) the set of candidate macro placements being evaluated.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Introduction

Aspects of the present disclosure relate to placing hard macros using machine learning predictions trained on different circuit designs. In a standard process for designing integrated circuits, front end designers develop register transfer level (RTL) or other functional descriptions of the integrated circuit. Back end designers, also known as physical designers, develop the physical aspects of the design. Typical processes in the back end design include floorplanning, placement and routing. The resulting physical designs describe the integrated circuit as a set of interconnected circuit blocks, including hard macro cells and standard cells. Standard cells are physical implementations of basic circuit building blocks, such as may be provided in a cell library from the foundry. Hard macro cells are larger blocks of circuitry, such as memory and I/O blocks. Macro cells may be developed by the designer or provided by third parties.

The placement of macro cells occurs early in the physical design process, in part because of their size. There may be limited flexibility in the placement of large macro cells due to their size, whereas smaller standard cells may be placed in the available areas between macro cells. The placement of macro cells can have a large impact on the physical aspects of the integrated circuit, such as congestion, wire length, timing and power consumption. However, quality metrics for these quantities typically are not calculated until much later in the physical design flow. After macro cells are placed, the standard cells may be placed. Then the entire design may be routed, followed by iterations to optimize the cell selection (e.g., changing standard cells), and the placement and routing of the integrated circuit. The most accurate calculation of quality metrics occurs after all these steps have been completed. However, if poor quality of results (QoR) at this late stage necessitates a change in the macro placement, all of these steps will have to be repeated for the new macro placement.

Therefore, it would be beneficial to estimate QoR metrics for different possible macro placements but without performing all of the steps of the full physical design process. Machine learning is a technology that may be used to predict QoR for different candidate macro placements. However, machine learning typically requires a large volume of training data, which in this case would be already completed designs where the QoR for different macro placements is already known. Collecting a large set of such training data can be time consuming and also difficult when there is not a large number of integrated circuits designs available. A machine learning model based on this large set of data also may not be very effective because designs for different integrated circuits can be very different due to different functionality, different sets of macro cells, different chip sizes, different technology nodes, different performance and different power requirements. Therefore, even if a large volume of training data could be collected, such a diverse set of training data can contain conflicting samples which would result in poor training results.

In the approaches described herein, machine learning is used to predict QoR for candidate macro placements, but the machine learning is implemented as a discerning ensemble of machine learning models. Rather than using all of the data from different designs to train a single universal machine learning model, an ensemble of different machine learning models are trained, each for a single design or a set of closely related designs. Each model, possibly in combination with some pre-processing and post-processing, is used to predict QoR metrics for a candidate macro placement. Some of these predictions are better than others, depending on whether the training designs (referred to as source designs) are closely related to the current design (referred to as the target design). The predictions from the different models are combined, weighted by the applicability of the source designs to the target design. Accordingly, the ensemble of machine learning models is referred to as a discerning ensemble.

Technical advantages of the present disclosure include, but are not limited to, the following. Providing QoR estimates during the macro placement stage improves the overall design cycle. In some cases, problems in QoR of the final physical design are the result of issues in the macro placement. Being able to predict these early in the design cycle allows designers to avoid these situations and the corresponding time-consuming rework. Furthermore, using machine learning models and the discerning ensemble of models allows training of the models with less data while still maintaining good prediction. This also reduces the amount of data storage and compute resources required to train the models and to implement the predictions based on these models.

Macro Placement Flow

Figure 1A:
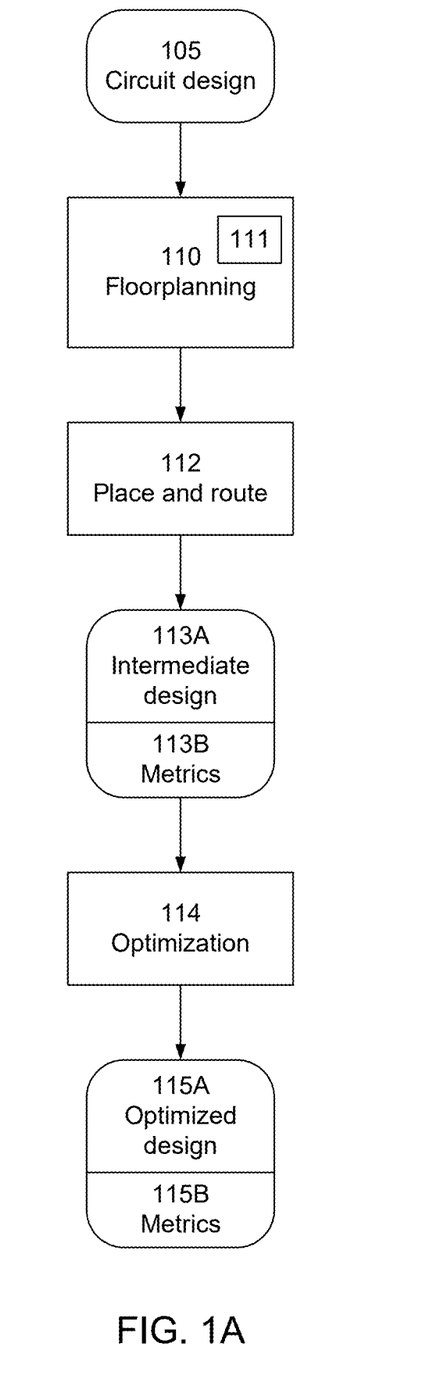
FIG. 1A is a flow diagram of a physical design flow according to some embodiments of the present disclosure.

FIG. 1A is a flow diagram of a physical design flow according to some embodiments of the present disclosure. The physical design flow takes a circuit design 105 and works on the physical aspects of the design implementation, including floorplanning 110, initial place and route 112 and optimization 114. Floorplanning 110 produces an initial rough layout of the integrated circuit. A floorplanned design includes rough placement of macro cells that implement the functionality of the integrated circuit, a rough boundary (physical area) around those cells, rough placement of input/output pads, and maybe some global routing estimates. In FIG. 1A, floorplanning 110 includes machine learning (ML)-based placement 111 of macro cells, as described in more detail herein. Place and route 112 includes more detailed placement of cells, including the selection and placement of standard cells, and also includes routing of interconnects between cells. The initial place and route 112 produces a physical design 113A, which is further optimized through iterations 114 to produce the final physical design 115A. Quality metrics, such as timing, congestion and power metrics, may be calculated at various stages of the design process. FIG. 1A shows metrics 113B and 115B calculated pre-optimization and post-optimization, respectively. The ML-based macro placement 111 uses machine learning models to predict these quality metrics 113B, 115B before they are actually available in order to guide the placement of macro cells. An example of macro placement flow 111 is shown in FIG. 1B.

Figure 1B:
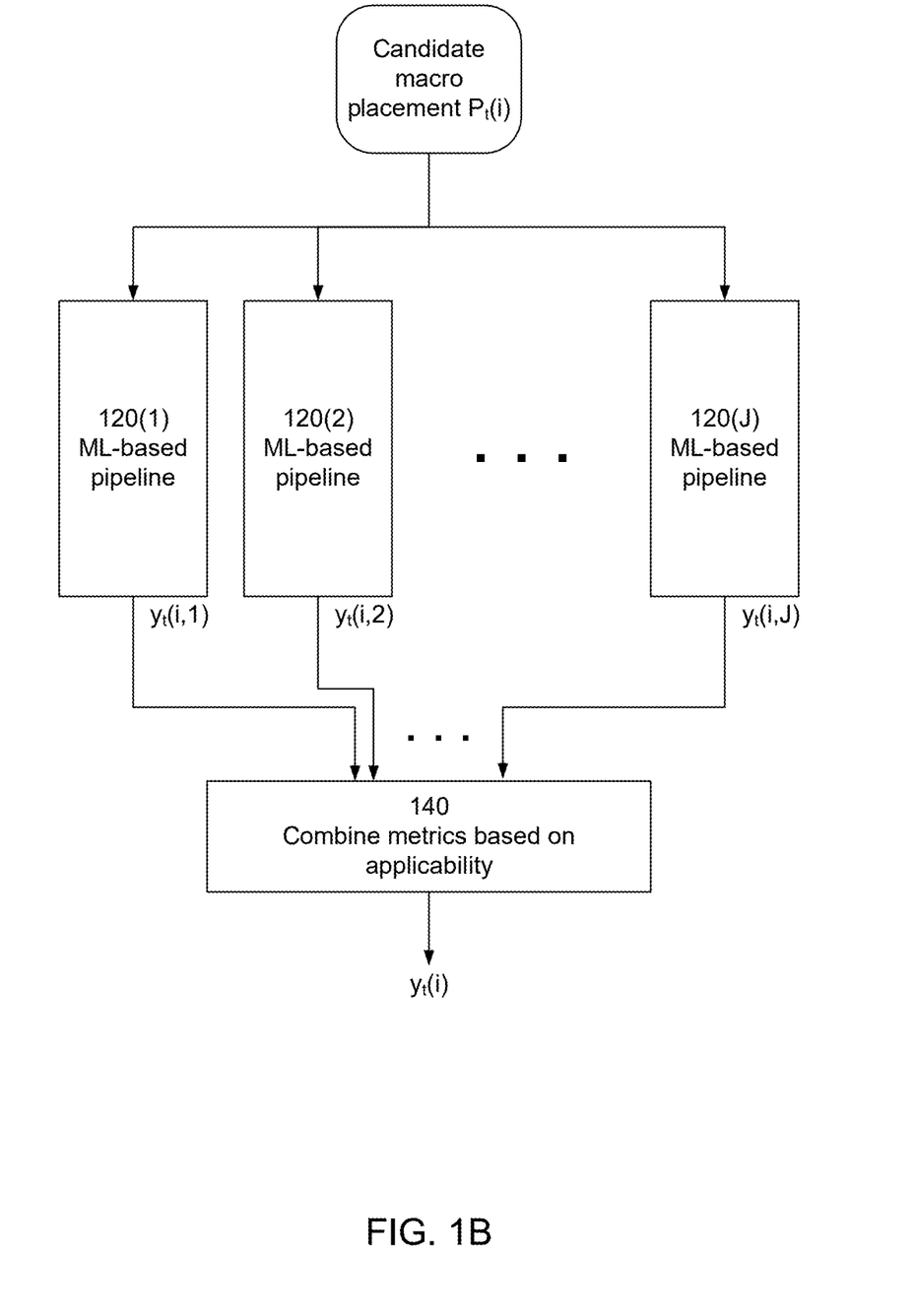
FIG. 1B is a flow diagram of a macro placement flow according to some embodiments of the present disclosure.

FIG. 1B is a flow diagram for a macro placement flow according to some embodiments of the present disclosure. The circuit design under consideration includes hard macro cells. The flow in FIG. 1B evaluates quality metrics for different candidate placements $P_t(i)$ of the hard macros, where i is the index and the subscript t stands for target, meaning that these placements are for the circuit design of interest. The individual candidate macro placements are $P_t(i)$ and the entire set of candidate macro placements is $\{P_t\}$. FIG. 1B shows the prediction of one metric $y_t(i)$ for one candidate placement $P_t(i)$.

At 120(j), each individual candidate macro placements $P_t(i)$ is applied to each of a plurality of machine learning-based pipelines, where j is the index for the pipelines. Each pipeline 120(j) predicts a corresponding quality metric $y_t(i,j)$ using a machine learning model, with different pipelines using machine learning models trained using different training sets of macro placements for different circuit designs. To avoid confusion, the macro placements and circuit designs used for training are referred to as source macro placements and source circuit designs and denoted by the subscript s, versus the subscript t for the target circuit design under consideration. The pipelines 120(i) may also include other types of processing, including pre- and post-processing, in addition to the machine learning model. At 140, the quality metrics $y_t(i,j)$ predicted by different machine learning models are combined to yield an overall estimate $y_t(i)$ of the quality metric. The metrics $y_t(i,j)$ are combined based on an applicability of the set of source macro placements used to train the machine learning models to the set of candidate macro placements $\{P_t\}$ (and not just the individual macro placement $P_t(i)$ being evaluated).

Figure 2:
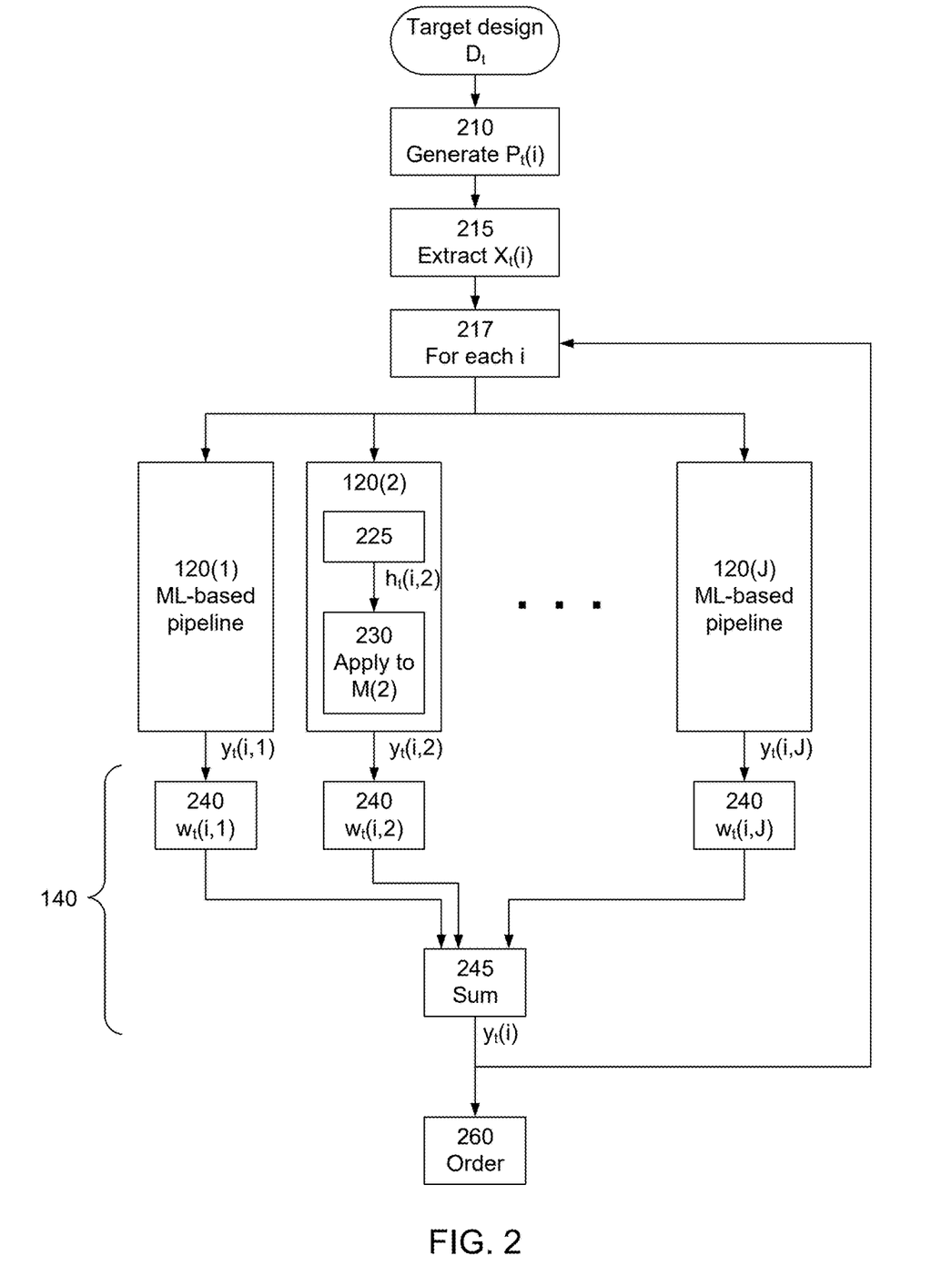
FIG. 2 is a flow diagram of another macro placement flow according to some embodiments of the present disclosure.

FIG. 2 is a flow diagram of an example implementation of the macro placement flow of FIG. 1B according to some embodiments of the present disclosure. In the following explanation, the flow before the pipelines 120(j) is first described. Then the operation of each pipeline 120(j) is described. Finally, the combining of metrics $y_t(i,j)$ predicted by the different pipelines 120(j) is described.

In FIG. 2, the different candidate macro placements $P_t(i)$ are represented by placement features $X_t(i)$, which are used as the input to the pipelines 120(j). The circuit design of interest is designated as Dt. The circuit design Dt includes hard macros. At 210, a set of candidate placements $\{P_t\}$ of the hard macros within the circuit design is generated. Each individual candidate macro placement $P_t(i)$ within the set specifies the placement (x,y location) of the hard macros within the integrated circuit.

The set of candidate placements $\{P_t\}$ may be generated by invoking physical design tools to explore different solutions. The placements may be generated in parallel. Tools used for floorplanning may be used to generate many different candidate placements by varying the configuration parameters for the tool. Examples of configuration parameters include macro grouping, shaping, and packing setting. Many combinations of configuration parameters are possible. Different macro placements may appear to be roughly the same at the floorplanning stage, but may turn out to have very different QoR once the rest of the physical design flow is completed.

At 215, placement features $X_t(i)$ for each candidate macro placement $P_t(i)$ are extracted. In this nomenclature, $P_t(i)$ is an individual macro placement and $X_t(i)$ are the corresponding placement features for that placement, whereas $\{P_t\}$ is the set of all candidate macro placements and $\{X_t\}$ is the corresponding set of all placement features.

Different placement features may be used. One class of placement features describes design statistics, for example, number of cells, number of hard macros, number of nets, number of hard macro pins, and so on. Another class of placement features describes macro placement topology, for example, macro placement area, proportion of macro area/macro placement area, macro pin connectivity, largest empty rectangles available for standard cell placement, distance between macro and largest empty rectangles, macro placement distribution, and so on.

The placement features may be normalized. In addition to extracting the placement features $X_t(i)$ for the target design, placement features from the source circuit designs may have been previously extracted in order to train the machine learning models. Normalizing the features may be useful to compare feature across different designs. For example, placement-invariant features may be normalized across all designs. Placement-invariant features are features that are independent of macro placement. Examples include the number of macros, number of routing layers, number of nets, and number of macro pins. As another example, placement-variant features may be normalized within each design. Placement-variant features are features that are dependent on the macro placement. Examples include boundary available ratio, size of largest empty rectangle, and distance from macro pins to macro group center.

The macro placements $P_t(i)$ are represented by the placement features $X_t(i)$ and these are used as input to the machine learning-based pipelines $120(j)$. At 217, the pipelines $120(j)$ are applied to each candidate placement $P_t(i)$ to estimate the corresponding quality metric $y_t(i)$ for that placement. This process is described below for an individual candidate placement $P_t(i)$/placement features $X_t(i)$ and metric $y_t(i)$, but it is repeated for other candidate placements and metrics.

Consider a single pipeline $120(j)$, as shown for pipeline $120(2)$ in FIG. 2. The pipeline $120(j)$ includes a machine learning model $M(j)$, which is trained on a set of source placement features $\{X_s\}(j)$. Different machine learning models $M(j)$ are trained using different sets of source placement features $\{X_s\}(j)$, often from different circuit designs. In one approach, a different machine learning model $M(j)$ is generated for each different circuit design. In another approach, designs that are similar may be grouped together to train a single machine learning model $M(j)$. The machine learning models and their training is described in more detail below.

The features $X_t(i)$ are not used as direct input to the machine learning model $M(j)$. Instead, at 225, the features $X_t(i)$ are first compressed to a lower dimension representation $h_t(i,j)$, wherein the compression is a lossy compression based on compressing the set of source placement features $\{X_s\}(j)$ with reduced loss. Since the set $\{X_s\}(j)$ is different for different pipelines (i.e., for different j), the compression is also different for each pipeline. At 230, the representation $h_t(i,j)$ is applied to the machine learning model $M(j)$ to predict a model-specific estimate $y_t$ (i,j) of the quality metric.

In FIG. 2, the combining 140 of model-specific metrics $y_t(i,j)$ is implemented as a weighted sum. At 240, the weight $w_t(i,j)$ applied to the predicted model-specific estimate $y_t(i,j)$ is based on an applicability of the set of source placement features $\{X_s\}(j)$ for that pipeline to the set of target placement features $\{X_t\}$ for the candidate placements. Applicability may be estimated based on the lossy compression used to generate the representation $h_t(i,j)$. Recall that the compression is designed to reduce loss for source placement features $\{X_s\}(j)$. That is, if $\{X_s\}(j)$ is compressed and then decompressed, the result will not be identical to $\{X_s\}(j)$ because the compression is lossy. Now if $\{X_t\}$ is compressed and decompressed using the same lossy compression designed for $\{X_s\}(j)$, there will also be a reconstruction loss. If the reconstruction loss for $\{X_s\}(j)$ and $\{X_t\}$ are similar, then $\{X_s\}(j)$ has higher applicability to $\{X_t\}$ and the corresponding estimate $y_t(i,j)$ is weighted more heavily. This is described in more detail below. At 245, the weighted metrics are summed to produce the overall estimate $y_t(i)$ for that candidate placement.

At 260, the candidate macro placements $P_t(i)$ are ordered according to their respective quality metrics $y_t(i)$. For example, the system may present the best candidate placement, or the best N candidate placements. If some candidate placements are similar with similar performance, the results may be deduplicated, so that the best N non-duplicative candidate placements are presented, for example.

In addition, the process above may be repeated for many different quality metrics. Examples of quality metrics include measures of congestion, wire length, timing, and power, such as overall congestion, total negative slack, and total power. Candidate macro placements that are good in one metric may be poor in another metric. Thus, the candidate macro placements may be evaluated based on some combination of the various metrics. For example, the designer may give different weights to different metrics.

The following sections provide more details and descriptions of the machine learning models and of determining applicability of metrics predicted by different models, according to some embodiments of the present disclosure. In these sections, the indices i and j are dropped for compactness of expression.

Training Machine Learning Models

In FIG. 2, the machine learning pipelines $120(j)$ take the placement features X as input and predict the metric y as output. The training set for the pipeline contains known samples of placement features X and their corresponding labels y. In different embodiments, the labels y, such as metrics for congestion, timing and power, may be extracted at different stages of the physical design flow. Labels y that are calculated post-optimization are more accurate, whereas those calculated pre-optimization require fewer computations to produce and are available earlier in the design cycle.

In some cases, the user may adjust the composition of the training set to balance accuracy and run time. If accuracy is more important, the training set may include more post-optimization samples. If run time is more important, the training set may include more pre-optimization samples.

In one implementation, the user may select from three different levels of computing effort. Low effort trains the models based solely on post-optimization data computed for already completed designs (i.e., not the current design of interest). Medium effort includes some pre-optimization samples from the current design. High effort includes post-optimization samples from the current design. The system may use "on-the-fly" data collected from the current design to increase the accuracy of the models. For example, models may be trained based on previously completed designs, and these pre-trained models may be modified by training further based on data collected from the current design. This can help to mitigate overfitting or underfitting of models in cases where the original designs are significantly different from the current design.

Training Data Applicability and the Discerning Ensemble

The candidate macro placements generated for different circuit designs may be obtained through the same process, i.e., by making the same variations of the configuration parameters (options) for the tool that generates the candidate placements. If the same or similar process is used to generate the set of candidate placements for many different circuit designs, then the distribution of placement features $\{X\}$ reveals information about the underlying design. If the source design and target design bear high "resemblance" of the distribution of features $\{X\}$, then it is likely that the labels $\{y\}$ will also be similarly distributed for the two designs. Furthermore, a model trained using a source set of features $\{X\}$ that is similar to the target set of features $\{X_t\}$ would then yield better prediction results for the metric $y_t$.

Here we use the term "resemblance" or "similarity", for easy understanding. In reality, model application is directional, i.e., from source (training) design to target (actual) design, while "similarity" is commutative, non-directional. So, machine learning model (or training data) applicability is also non-commutative.

Hence, the discerning ensemble approach may be used. Different source designs (or sets of closely related designs) can be used to train different models. Each source design can be used to train a base model to make predictions, which are weighted based on the applicability of the source design to the target design. This approach separates data from different source designs during training, rather than using data from all source designs to train a single universal machine learning model.

Figure 3A:
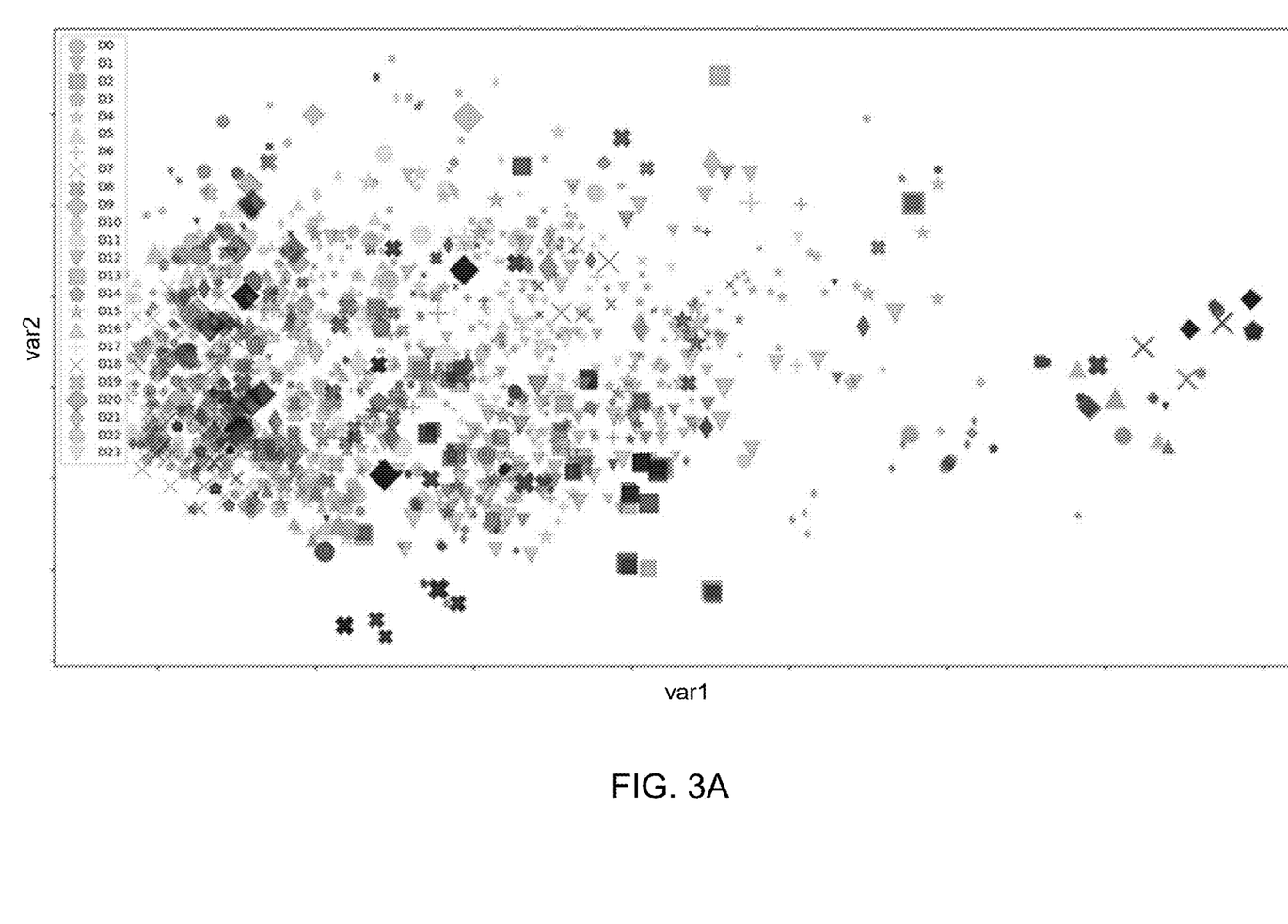
FIG. 3A shows feature data of 24 circuit designs plotted using principal component analysis according to some embodiments of the present disclosure.
Figure 3B:
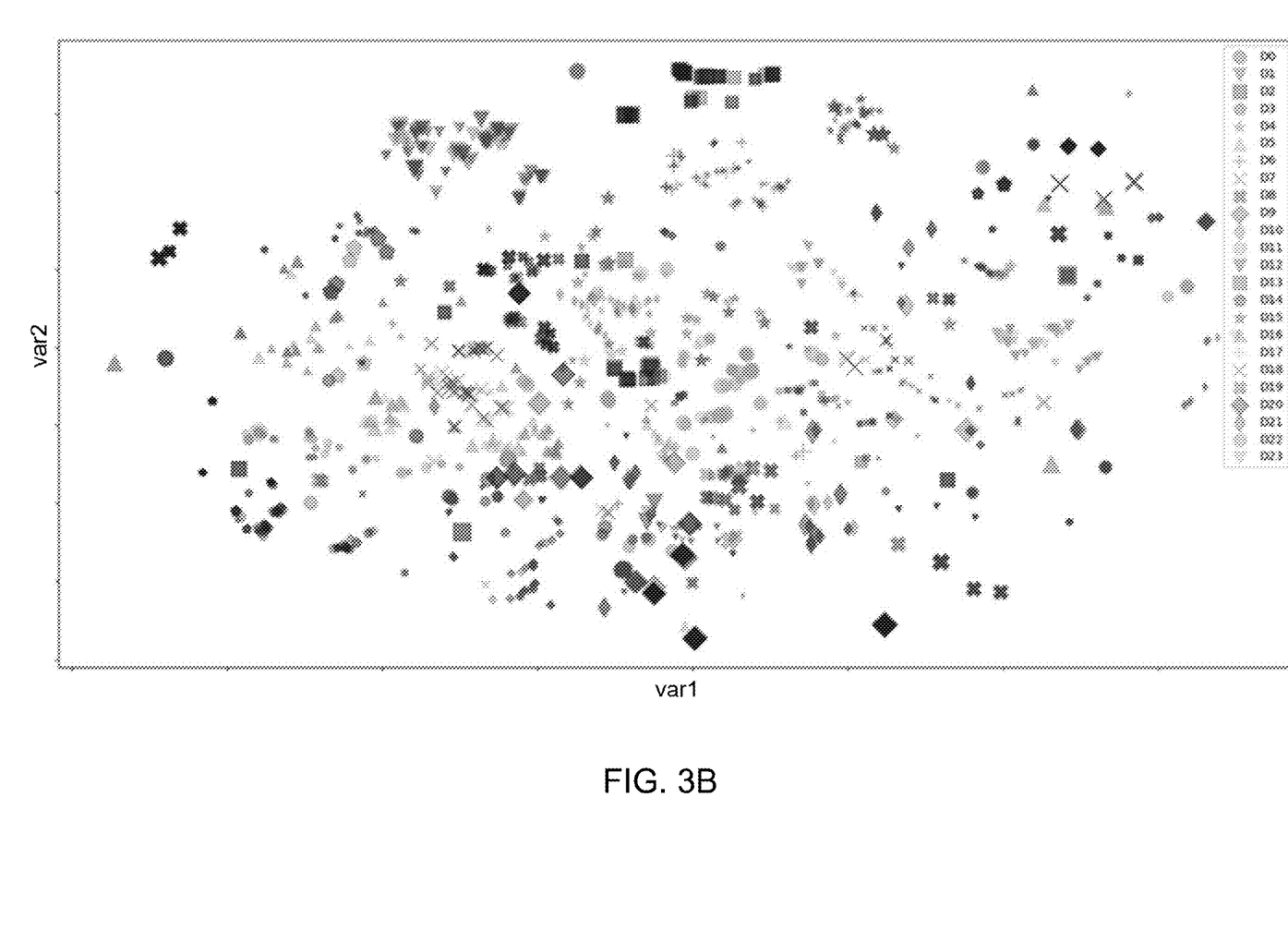
FIG. 3B shows feature data of the same 24 circuit designs plotted using manifold learning according to some embodiments of the present disclosure.

FIGS. 3A and 3B show the feature distributions $\{X\}$ and metrics $\{y\}$ of different designs. In these figures, 24 designs are represented by the color and shape of the symbols. As shown in the figure legend, design 00 is represented by the pink circles, design 01 is represented by the green upside-down triangles, etc. Each instance of a symbol corresponds to a different macro placement for that design. All of the pink circles are different macro placements for design 00, all of the green upside-down triangles are different macro placements for design 01, etc. The size of the symbol indicates the value of the metric y for that macro placement. The features $\{X\}$ are represented by the position of the symbol with respect to var1 and var2. The many-dimensional features $\{X\}$ are projected onto the two dimensions (var1, var2) in FIGS. 3A and 3B for purposes of illustration.

These figures show that distributions from different designs are generally very different from each other. This may lead to contradicting labels in regions where different designs overlap. Thus, mixing all design data to train a single model yields mediocre performance, due to overfitting and ignoring differences in the data characteristics from different designs.

FIG. 3A illustrates feature data from 24 design files plotted using principal component analysis (PCA) according to some embodiments of the present disclosure. That is, the two dimensions var1 and var2 shown in FIG. 3A are determined by PCA. Different designs have different distributions in the same principal components axes for all 24 designs. Also, the values of metric y (congestion in this example) are quite mixed in regions where different designs overlap.

FIG. 3B illustrates the same feature data from the same 24 design files plotted using manifold learning according to some embodiments of the present disclosure. With this selection of the two dimensions var1 and var2 in FIG. 3B, most designs have only a few close neighbors. There is more separation of designs.

Estimating Applicability

The system described herein is based on the concept of applicability in machine learning (ML) predictions for macro placements. Let the tool option values be represented by $\{d_i^k\}$, where k is index for the options which is an integer typically <10, i is the i-th possible combination of options. Then $d^k$ is the tool option #k, and has a limited number of values, and $\{d_i\}$ would represent all possible options for macro placement allowed by the tool. For each option combination, $d_i$, the system collects $X_i$ from the macro placements, thus all possible placements can be represented by the set of placements $\{X_i\}$. In general, $|\{X_i\}|<=|\{d_i\}|$, where | | indicates number of unique values.

Using only the tool options $\{d_i\}$ as the inputs to the machine learning model would not result in a model that makes good predictions across different designs, since all designs that went through the same process for ML data generation would have the same $\{d_i\}$ but their labels $\{y_i\}$ would be different. Thus, the system uses the placement features $\{X_i\}$ for prediction. Since most designs have different distribution of $\{y_i\}$, the differences in $\{X_i\}$ from different designs would help resolve the diversity of behaviors. The system also performs some overlapping of $\{X_i\}$ from different designs to have confidence in predictions. $\{X_i\}$ may represent raw data features with some normalizations. In alternative embodiments, the system can use learned $X_L$ from $X_i$. We select or engineer $\{X_i\}$, so that each has good prediction power for $\{y_i\}$. This is typically done in the early or middle stage of development of the model.

From above basic setup, the system can try to span the data space so that the system treats the data space as surfaces, instead of as a limited number of discrete points, $|\{d_i\}|$. Assuming $d_i$ can take continuous values, for example the option of True/False would be transformed into [0.0, 1.0] and then the corresponding $\{X_i\}$ would span a surface in a high dimension space. This perspective allows us to view $\{X_i\}$ as a manifold, instead of just $N=|\{d_i\}|$ number of points. It is worth noting that the data label would be "noisy" as tool behavior has a certain degree of randomness. As a result, when using the label $\{y_i\}$, we generally assume it is the expected value, with a variance.

From this perspective, different designs (netlists) would produce different manifolds, and no two different designs would have the same manifold. However, if two manifolds do have large regions of overlap, the target values, which can be viewed as colors on the manifolds, would also be similar. If not, those are contradicting designs, and should be excluded from the training set. For a good prediction, we might not find the best matched design. Instead, the task is to find a combination of source manifolds, that can best predict the target manifold.

In the following, use $\{X_s\}$ and $\{X_t\}$ to represent the source and target manifold respectively. Also, the system may use $\{X_s\} \to \{X_t\}$ to represent the model prediction using the source design to predict on the target design. For a good prediction, similarity of $\{X\}$ and $\{X_t\}$ is a sufficient, but not a necessary condition. Instead, coverage of $\{X_t\}$ by $\{X\}$ is a necessary condition for a good prediction. The assumption made that interpolation is significantly better than extrapolation, is generally true. The coverage of $\{X_t\}$ by $\{X_s\}$ can be defined as:

$$\text{coverage of } t \text{ by } s = \{X_t\} \cap \{X_s\}/\{X_t\} \tag{1}$$

Eq. 1 may be intractable and not well defined for close regions between $\{X_t\}$ and $\{X_s\}$.

Instead, we may take a different approach. Since we only have a limited number of samples, the system will compress $\{X\}$ into lower dimensions, while keeping as much information as possible, and then decompress to recover the original data with little loss. If $\{X\}$ is truly a manifold, it will recover well in this process. In symbolic terms:

$$\{X_s\} >>_\theta {}^{X_s}\{h_s\} <<\Psi^{X_s}\{\acute{X}_s\} \tag{2a}$$

$$\{X_t\} >>_\theta {}^{X_t}\{\tilde{h}_t\} <<\Psi^{X_t}\{\ddot{X}_t\} \tag{2b}$$

where >> indicates compression (or encode), << indicates decompression (or decode), and they can also be functions parameterized by the input and training objectives. The super script indicates the data used in parameterizing the process, while the subscript indicates the parameter used in the process. The forms in Eqs. 2a and 2b preserve the direction of the flow of information.

In some literatures, those processes would be written as functions, for example for $X_t$, $h_t$ and $\acute{X}_t$:

$$h_t = q_\phi(X_t) \tag{3}$$

$$\acute{X}_t = p_\theta(h_t) = p_\theta(q_\phi(X_t)) \tag{4}$$

where $\phi$ and $\theta$ are determined from the least regeneration loss or other loss metrics, for example $$\min(|\acute{X}_t - X_t|) = \min_{\theta,\phi}(|p_\theta(q_\phi(X_t)) - X_t|) \tag{5}$$

Techniques like autoencoder, dimension reduction, etc. all adopt the same basic principles in Eqs. 3-5. The reconstruction loss, $|\acute{X}_t - X_t|$ is the separation of two manifolds $\{X_t\}$ and $\{\acute{X}_t\}$, if we assume that the same points are mapped to the same points before and after the transformation.

Note that the encode (>>) process and the decode (<<) process in Eq. 2a and Eq. 2b are the same function but parameterized by different data, $X_t$ vs $X_s$. If Eq. 2a is the part of the training process on $X_s$, then to evaluate the target design, the same encoding and decoding function would be applied:

$$\{X_t\} >>_\theta {}^{X_s}\{h_t\}_\psi {}^{X_s}\{\acute{X}_t\} \tag{6}$$

Comparing Eq. 2b and Eq. 6, Eq. 6 shows the regeneration of $X_t$ from a mismatched encoder and decoder and it can be proved that reconstruction loss $$|\ddot{X}_t - X_t| \le |\acute{X}_t - X_t| \tag{7}$$

If we use a general loss form for reconstruction loss as $L(X_t, \acute{X}_t)$, then we can estimate the target prediction loss as:

$$L(y_t, \acute{y}_t) = \frac{L(X_t, \acute{X}_t)}{L(X_s, \acute{X}_s)} L(y_s, \acute{y}_s) \tag{8}$$

The inverse of $$\frac{L(X_t, \acute{X}_t)}{L(X_s, \acute{X}_s)}$$

is one example of an applicability score, and it should be in the range of (0,1]. Consider the fact that in rare situations, $L(X_s, \acute{X}_s) > L(X_t, \acute{X}_t)$, we can truncate the applicability score to be $\le 1$, or its inverse $\ge 1$. That would also make Eq. 8 more robust:

$$L(y_t, \acute{y}_t) = \max\left(\frac{L(X_t, \acute{X}_t)}{L(X_s, \acute{X}_s)}, 1\right) L(y_s, \acute{y}_s) \tag{8a}$$

Eq. 8 assumes that y is produced in the same process as $\acute{X}$, i.e., both y and $\acute{X}$ are produced from the same decoding process:

$$\{X_s\} >>_\theta {}^{X_s}\{h_t\} <<_\psi {}^{X_s,y_s}\{\acute{X}_s, \acute{y}_t\} \tag{9a}$$

$$\{X_t\} >>_\theta {}^{X_s}\{h_t\} <<_{104} {}^{X_s,y_s}\{(\acute{X}_t, \acute{y}_t\} \tag{9b}$$

Eqs. 9a-9b express the assumption that label y can be described by the decoding process, and we can assume that other types of model prediction approximates it. Then the ratio of $L(y, \acute{y})/L(X, \acute{X})$, which we named as the loss extrapolation ratio, is roughly the same regardless if the data is from the same or similar process. This is a reasonable estimate and can be verified. Note, different target types, (if y has multiple channels), would yield different ratios. Also, for a large set of $X_s$ and $y_s$, it may help to estimate the range of loss extrapolation ratio, using bootstrap, and use the lower bound of loss extrapolation ratio to be conservative.

Based on bias-variance decomposition:

$$E[(y-\acute{y})^2] = \text{Bias}^2 + \text{Var}(y) + \text{Var}(\acute{y}) \tag{10}$$

where $$\text{Bias} = [E(\acute{y}) - E(y)]^2 \tag{11}$$

$$\text{Var}(y) = E(y^2) - E^2(y) \tag{12}$$

$$\text{Var}(\acute{y}) = E(\acute{y}^2) - E^2(\acute{y}) \tag{13}$$

Bias is the systematic error that cannot be reduced without changing the model, i.e., function for f. Var(y) is the irreducible error and defines the noise associated with the ground truth and cannot be reduced. Var($\acute{y}$) is associated with uncertainty of model parameter, construction, etc. If we use the mean square error as prediction loss in Eq. 8, then it can also be decomposed into the bias and variance terms as in Eq. 10.

$$L(y_s, \acute{y}_s) = \text{Bias}_{y_s, \acute{y}_s}^2 + \text{Var}((y_s) + \text{Var}(\acute{y}_s) \tag{14}$$

$$L(y_t, \acute{y}_t) = \text{Bias}_{y_t, \acute{y}_t}^2 + \text{Var}(y_t) + \text{Var}(\acute{y}_t) \tag{15}$$

In general, we can assume Var($\acute{y}_s$)=Var($\acute{y}_t$), Var($y_s$)≈Var($y_t$), so the majority differences between the losses of source and target data, is caused by the differences in bias in Eq. 14 and 15. The bias differences mostly come from the shape of the manifolds, $\{X_s\}$ and $\{X_t\}$. So, it makes sense to modify Eq. 8 for the bias terms.

$$\text{Bias}^2_{y_t, \hat{y}_t} = \max\left(\frac{L(X_t, \hat{X}_t)}{L(X_s, \hat{X}_s)}, 1\right) \text{Bias}^2_{y_s, \hat{y}_s} \tag{16}$$

Combining Eqs. 14-16:

$$L(y_t, \hat{y}_t) = \max\left(\frac{L(X_t, \hat{X}_t)}{L(X_s, \hat{X}_s)}, 1\right)\left[L(y_s, \hat{y}_s) - \text{Var}(y_s) - \text{Var}(\hat{y}_s)\right] + \text{Var}(y_t) + \text{Var}(\hat{y}_t) \tag{17}$$

Or with the assumption $\text{Var}(\hat{y}_s) = \text{Var}(\hat{y}_t)$, $\text{Var}(y_s) \approx \text{Var}(y_t)$, $$L(y_t, \hat{y}_t) = \max\left(\frac{L(X_t, \hat{X}_t)}{L(X_s, \hat{X}_s)}, 1\right) L(y_s, \hat{y}_s) - \max\left(\frac{L(X_t, \hat{X}_t)}{L(X_s, \hat{X}_s)} - 1, 0\right)\left[\text{Var}(y_s) + \text{Var}(\hat{y}_s)\right] \tag{18}$$

If $L(y_s, \hat{y}_s)$ $\text{Var}(y_s) + \text{Var}(\hat{y}_s)$, then Eq. 18 degenerates into Eq.8a. Generally, $\text{Var}(y_s)$ and $\text{Var}(\hat{y}_s)$ are not available due to lack of sufficient data, and one would have to use Eq. 8a. We suggest to estimate $\text{Var}(y_s)$ and $\text{Var}(\hat{y}_s)$ separately from a few cases, and use them with care to ensure that $\text{Bias}_{y_s, \hat{y}_s}^2 = L(y_s, \hat{y}_s) - \text{Var}(y_s) - \text{Var}(\hat{y}_s) > 0$ and reasonable. $\text{Var}(y_s)$ and $\text{Var}(\hat{y}_s)$ can be made hyperparameters or even trainable.

When a subset of $\{X_t\}$, say $\{X_t^{sub}\}$, has labels, then their projected loss (or bias) can be computed without errors. So, a portion $|X_t^{sub}|/|X_t|$ has accurate prediction loss, but the rest $1-|X_t^{sub}|/|X_t|$ has projected prediction loss. Then the projected prediction loss for the whole set is:

$$L(y_s, \hat{y}_s) = (|X_t^{sub}|/|X_t|)L(y_s^{sub}, \hat{y}_s^{sub}) + (1-|X_t^{sub}|/|X_t|)L(y_s^{-sub}, \hat{y}_s^{-sub}) \tag{19}$$

where $L(y_s^{-sub}, \hat{y}_s^{-sub})$ can be computed as in Eqs. 17-18 for the subset without labels.

Traditionally, ensemble models are used to combine predictions from weaker learners and yield better performance than the individual base learners. This is especially true when the data set is large and exhibits complicated structures. An ensemble method splits data into smaller subsets, such as m-fold subsets or bootstrap sampling, where each has less complicated structures and are easier to train and can fit the subset better. When all subset models are combined, the more complicated structures in the data can be combined from all base learners. Also, there are techniques to use proper weight to further reduce the training error. For example, if an ensemble model has n base learners, $\hat{y} = \Sigma_i y_i(X)$, i=1, ..., n, the basic ensemble output is: $\hat{y} = \Sigma_i y_i(X)$, the weighted ensemble output is: $\hat{y} = \Sigma_i w_i \hat{y}_i(X)$.

Typically, the weighting technique can be described as:

$$\min_{w_i} MSE\left(\sum_i w_i \hat{y}_i(X), y\right) \tag{20}$$

s. t.

$$\sum_i w_i = 1, \text{ and } w_i > 0$$

These weighting techniques use data labels and, in practice, hold out data in the training data set can be used. But for the unseen target data set, the weighting is fixed. However, the system uses the model/data applicability concept described earlier to weight base learners. This kind of ensemble is different from existing ones, as it uses each weak learner's applicability to the unseen target data set (note, it may need a large set of inputs). In a sense, it is adaptive to the target data set. This ensemble approach is referred to as a discerning ensemble, as each base learner identifies its applicability to the target data set, as is described in detail in the following.

Suppose training data and target data can be grouped by how data is generated. Each group would have the same characteristics, i.e., a unique manifold. For example, in EDA, one design can produce a set of ML data, which would share the same characteristics. At the same time, certain designs are more related to some than others, and so is their ML data. In another example, training data can be grouped by similar objects with the least reconstruction loss and the best prediction confidence for the given object type. Then each base learner is a special purpose learner in the ensemble. Those cases would be suitable for the discerning ensemble method. Assume the training (source) data set can be divided into m groups, with the assumption that each group form a unique manifold, or a compressible entity. For example, the macro placement ML data from one design can form one such group.

So the training (source) data can be expressed as: $\{(X^s, y^s)\} = \{(X_i^s, y_i^s) \ldots \}$, i=1, ..., m and $(X_i^s, y_i^s)$ is group i. For each group i, we can build a base learner as:

$$\hat{y}_i = \hat{y}_i(X) \tag{21}$$

&

$$\min_\theta L(\hat{y}_i(X_i^s, \theta), y_i^s)$$

For each base learner, we can estimate its loss for unseen target data $\{(X^t, y^t)\}$ using Eq. 8a or Eq. 17. Suppose we use Eq. 8 for simplicity:

$$L_i(y^t, \hat{y}^t) = \frac{L(X^t, \hat{X}^t)}{L(X_i^s \hat{X}_i^s)} L(y_i^s, \hat{y}_i^s) \tag{22}$$

The real loss from the whole target data set might not be available, so Eq. 22 is the projected loss for each base learner, and we could use the lower estimate of the loss extrapolation ratio, as we mentioned earlier.

With the projected loss, now we can assign weights for the base learners in the ensemble. Weight $w_i$ is in inverse relationship with the projected loss $L_i$. One choice is:

$$\hat{y} = \sum_i w_i \hat{y}_i(X) \tag{23}$$

$$w_i = \frac{1}{L_i(y^t, \hat{y}^t)}$$

Other choices are possible too, such as this one based on bias:

$$w_i = \frac{1}{L_i(y^t, \hat{y}^t) - \text{Var}(y^t) - \text{Var}(\hat{y}^t)} \quad (24)$$

where $\text{Var}(y^t)$ and $\text{Var}(\hat{y}^t)$ can be estimated as described earlier.

If we pick one of the training designs as the target design, we expect the training design has a weight close to infinity, while other designs have weights close to 0. That is not the case for Eqs. 23-24. To achieve that, we can define the following weight:

$$w_i = \frac{1}{\max(L_i(y^t, \hat{y}^t) - L_i(y^s, \hat{y}^s), \epsilon)} \quad (25)$$

where $\epsilon \ll 1$. However, Eq. 25 assumes that training design data has zero noise or uncertainty. That would cause overfitting. To achieve similar effect, one can use Eq. 24 by assigning:

$$\text{Var}(y^t) + \text{Var}(\hat{y}^t) = L_i(y^s, \hat{y}^s) - \epsilon \text{ and } \epsilon \ll 1 \quad (26)$$

Then Eq. 24 would become:

$$w_i = \frac{1}{L_i(y^t, \hat{y}^t) - L_i(y^s, \hat{y}^s) + \epsilon} \quad (27)$$
$$= \frac{1}{\max(L_i(y^t, \hat{y}^t) - L_i(y^s, \hat{y}^s), 0) + \epsilon}$$

The max ( ) in Eq. 27 ensures the assumption that $L_i(y^t, \hat{y}^t) > L_i(y_s, \hat{y}^s)$.

It may be possible to make this inverse relationship a learnable function and tuned for the least fitting errors from the ensemble. There are many possible functions for this kind of inverse relationship. Also, different types of data or problem, would warrant different types of weighting functions. For example, for a discerning ensemble built with special purpose learners, it may make sense to only use the most applicable base learner. Then functions producing one-hot encoding result can be used as weight.

Discerning Ensemble Applied to Macro Placement

The discerning ensemble techniques can be applied to various domains, for example, making predictions related to sensor data, autonomous vehicles, robotics, and so on. Here, the formulations for the discerning ensemble technique are applied to macro placement prediction. This approach when applied to macro placement can include the following characteristics:

1) Training data is grouped by design. Similar designs can be treated as one group. Each group forms one base learner (machine learning model).
2) An optional small subset of "online" (on-the-fly) data from the current design may be used to further train the base learners.
3) Each group, or base learner, is evaluated against the unseen target data set, using all input features from (all) possible instances, without requiring any labels, to estimate the projected prediction loss, or bias, etc. and apply proper weight that is in inverse relationship with the loss or bias, etc.

For macro placement, the system may use a tree-based regression model as the machine learning model for the base learner. To reduce noise in the placement features {X}, the system uses dimension reduction techniques to reduce the dimensionality of {X} from ~60 to 6. The loss extrapolation ratio defined in Eq. 8, would require that model prediction {ŷ} be produced in the same process as the reconstructed {X̂}. Since tree-based regression solutions cannot reconstruct {X}, the best we can do is to use the same dimension reduction technique as we reconstruct {X}. The system uses the transform and inverse transform in PCA to encode/compress {X} and decode/decompress for {X̂}. For the source data, Eq. 2a becomes:

$$\hat{X}_s = \text{PCA.invse}(\text{PCA.trans}(X_s)) \quad (28)$$

where PCA.trans( ) is the forward PCA transform and PCA.invse( ) is the inverse PCA transform. Eq. 6 becomes:

$$\hat{X}_t = \text{PCA.invse}(\text{PCA.trans}(X_t)) \quad (29)$$

where the PCA transforms are the same as in Eq. 28. Also, the PCA transform used in Eq. 28 is also used in encoding {X} for the regression base model.

Experimental Results

Table I below compares ML-based macro placement with manual placement efforts. The ML based macro placement flows described above were applied to several different integrated circuit designs, labeled Design 1 to Design 7 below. In this example, the quality metrics were worst negative slack (WNS), total negative slack (TNS) and congestion. For each metric, there are two columns: one tabulating the ML-based results for different designs and one tabulating the manual placement results. As can be seen, the ML-based solutions are comparable to the best manual results, which took more than several weeks to complete.

TABLE I

| | Comparison of ML-based and Manual Macro Placements | | | | | |
|---|---|---|---|---|---|---|
| | WNS | | TNS | | Congestion | |
| | ML | Manual | ML | Manual | ML | Manual |
| Design 1 | 0.1 ns | −0.07 ns | −0.62 ns | −4.23 ns | 493 (0.01%) | 21366 (0.28%) |
| Design 2 | −0.017 ns | −0.045 ns | −1.976 ns | −1.563 ns | 460324 (1.22%) | NA |
| Design 3 | −117 ps | −118.30 ps | −3286182.0 ps | −3189674.2 ps | 9677 (0.20%) | 9853 (0.2%) |

TABLE I-continued

Comparison of ML-based and Manual Macro Placements

| | WNS | | TNS | | Congestion | |
|---|---|---|---|---|---|---|
| | ML | Manual | ML | Manual | ML | Manual |
| Design 4 | −759.59 ps | −539.72 ps | −4962718 ps | −396773.24 ps | 13581 (0.12%) | 8611 (0.07%) |
| Design 5 | −0.56 ns | NA | −71.26 ns | NA | 87967 (0.59%) | NA |
| Design 6 | −0.18 ns | −0.35 ns | −2.11 ns | −20.13 ns | 37440 (0.29%) | NA |
| Design 7 | −0.27 ns | −0.01 ns | −3.0 ns | −0.04 ns | 65398 (0.33%) | 52985 (0.26%) |

Advantages and Variations

Comparing to traditional ML approaches, the discerning ensemble not only can offer superior results for macro placements, but may also offer the following advantages.
1) The projected prediction loss and bias for each base model can offer great insight in understanding the ensemble's behavior and help debug poor performances. For example, if the target design is significantly different from all existing source designs, all projected prediction losses would be poor. One remedy for this case is to have a full set of data collection on the target design, so that future predictions on similar designs would be more accurate. If some base models have very high applicability score, but the predictions are bad, then either the labels might be incorrect, or the source design might be excluded from the ensemble as a contradicting design. If the latter, data features might be redesigned.
2) The discerning ensemble can be treated as a repository of special purpose models. Each base model can be separately trained and managed without affecting others. In other ML methods where the model is trained from the complete data set, when even a small subset is changed, the whole model must be retrained. Here, the discerning ensemble also supports adding new base models when new data or new machine learning models are added to the ensemble. This can streamline model development.
3) The discerning ensemble allows managing its base models based on their applicability scores, projected prediction losses, bias scores, etc., requiring less software and/or model updates. It also supports querying for or ranking of relevant designs from applicability scores, etc.
4) The discerning ensemble allows a large collection of models to be used, with less concerns for corrupted performances due to irrelevant data. That is especially useful in cloud applications.

In addition to the discerning ensemble method, the system may implement many data preprocessing methods that also contribute to performance. To ensure that the features and labels can be used across different designs, the system may apply normalization methods. Some features may be normalized within the design, some are normalized across all designs. The objective is to enhance cross-design prediction accuracy. Also, we evaluate all features' cross-design prediction powers, and develop new features and eliminate useless features based on that.

Instead of using the applicability score, projected prediction loss, projected prediction bias, etc., there are possible other work around for selecting relevant training designs. For example:

1) Use the meta data that describe the characteristics of the design, such as # of standard cells, macros, chip size, technology, etc., to select as source designs those designs that share similar meta data as the target design.
2) Use certain features in the source data set as labels, and then use the source designs to predict the target design's certain features. If the source design can offer good prediction, then intuitively it is more relevant to the target design. One can use the prediction losses for the selected features, as a pseudo metrics for the applicability of source design to target design. This can be regarded as a special case of the compression and decompression technique described above.

Additional Considerations

Figure 4:
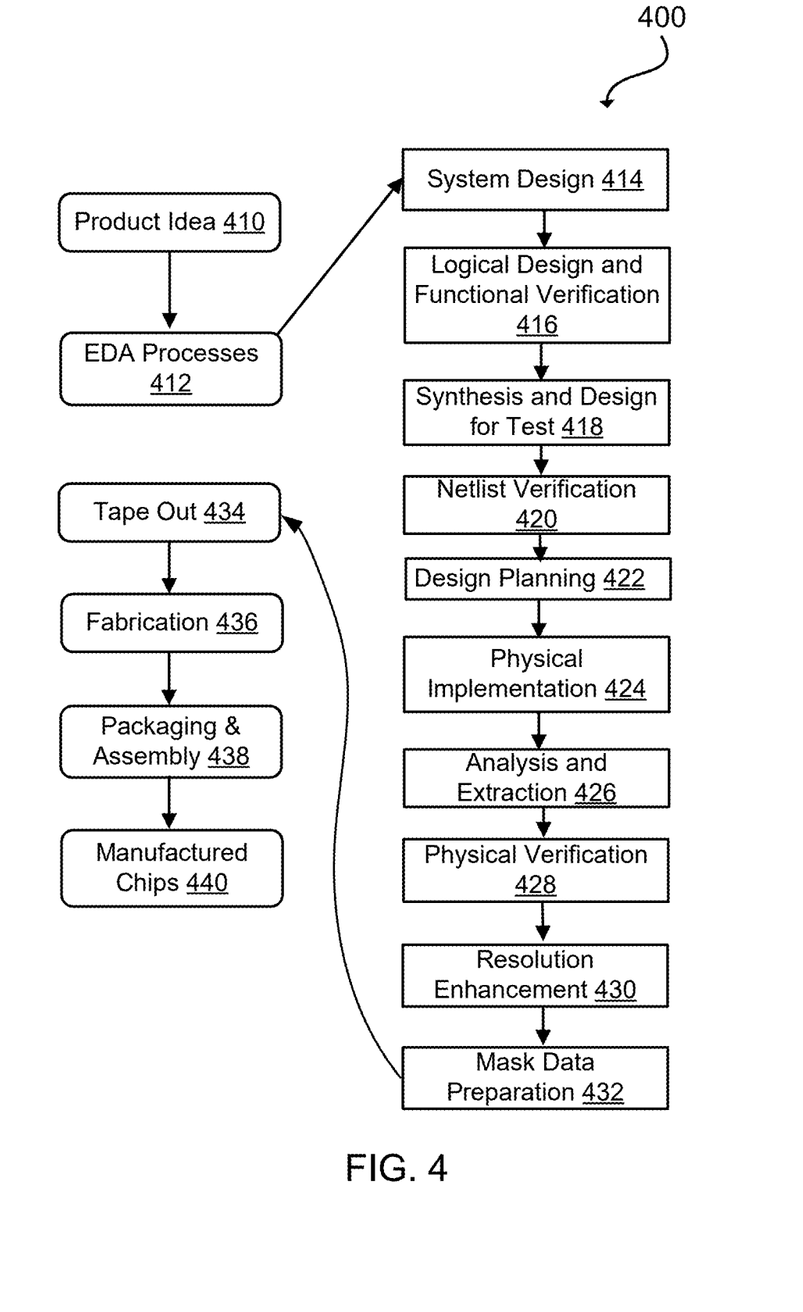
FIG. 4 depicts a flowchart of various processes used during the design and manufacture of an integrated circuit in accordance with some embodiments of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 4. The processes described by be enabled by EDA products (or EDA systems).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
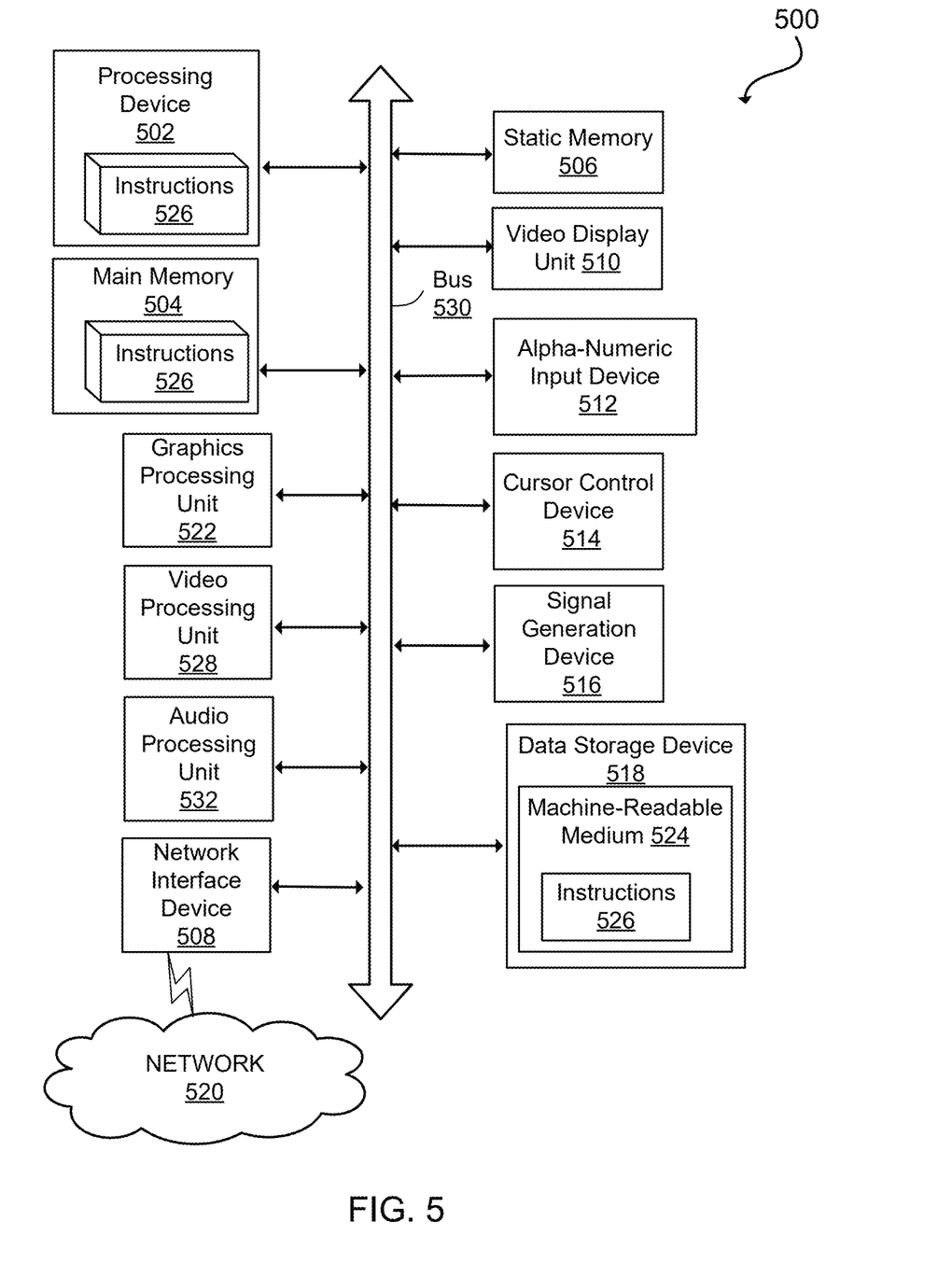
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method comprising:
   accessing a set of candidate macro placements of hard macros within a circuit design; and
   estimating, by a processing device, a quality metric for each candidate macro placement, comprising:
   predicting a plurality of model-specific estimates of the quality metric, comprising applying different machine learning models to predict each of the different model-specific estimates, wherein the machine learning models applied for different model-specific estimates are trained using sets of source macro placements for different source circuit designs; and
   combining the model-specific estimates of the quality metric, wherein the combining is based on an applicability of (a) the set of source macro placements for each model-specific estimate to (b) the set of candidate macro placements.

2. The method of claim 1 wherein, for each candidate macro placement, predicting the plurality of model-specific estimates of the quality metric comprises:
   extracting placement features $X_f(i)$ for the candidate macro placement, where i is an index for different candidate macro placements;
   for each model-specific estimate:
   compressing the placement features $X_f(i)$ to a lower dimension representation $h_f(i,j)$, wherein j is an index for different model-specific estimates and the compression is a lossy compression based on compressing (a) the source set with reduced loss; and applying the representation $h_r(i,j)$ to the corresponding machine learning model to predict the model-specific estimate of the quality metric.

3. The method of claim 2 wherein, for each candidate macro placement and each model-specific estimate: the applicability of (a) the source set to (b) the candidate set is estimated based on a projected loss of (b) the candidate set compressed using the lossy compression $h_r(i,j)$ for (a) the source set.

4. The method of claim 1 wherein, for each candidate macro placement: combining the model-specific estimates of the quality metric comprises calculating a weighted linear combination of the model-specific estimates of the quality metric, wherein weights for the weighted linear combination are based on the applicability of (a) the source set to (b) the candidate set.

5. The method of claim 4 wherein, for each candidate macro placement: the weights for the weighted linear combination are based on a projected loss of (b) the candidate set compressed using a lossy compression $h_r(i,j)$ for (a) the source set.

6. The method of claim 4 wherein, for each candidate macro placement: the weights for the weighted linear combination are inversely proportional to a projected loss of (b) the candidate set compressed using a lossy compression $h_r(i,j)$ for (a) the source set.

7. The method of claim 4 wherein, for each candidate macro placement: the weights for the weighted linear combination are based on a bias of a projected loss of (b) the candidate set compressed using a lossy compression $h_r(i,j)$ for (a) the source set.

8. The method of claim 1 wherein the applicability of (a) the source set to (b) the candidate set is estimated without using labels for either (a) the source set or (b) the candidate set.

9. The method of claim 1 wherein the applicability of (a) the source set to (b) the candidate set is estimated based on a coverage of (b) the candidate set by (a) the source set.

10. A non-transitory computer readable medium comprising stored instructions, which when executed by a processing device, cause the processing device to:

access a set of candidate macro placements of hard macros within a circuit design; and estimate a quality metric for each candidate macro placement, comprising:

extracting placement features for the candidate macro placement; and predicting a plurality of model-specific estimates of the quality metric from the placement features, comprising applying different machine learning models to predict each of the different model-specific estimates, wherein the machine learning models applied for different model-specific estimates are trained using sets of source macro placements for different source circuit designs; and combining the model-specific estimates of the quality metric.

11. The non-transitory computer readable medium of claim 10 wherein the placement features comprise features that depend on statistics of the circuit design and features that depend on a placement of hard macros within the circuit design.

12. The non-transitory computer readable medium of claim 10 wherein the placement features comprise features that are independent of a placement of hard macros within the circuit design and that are normalized across different circuit designs.

13. The non-transitory computer readable medium of claim 10 wherein the placement features comprise features that depend on a placement of hard macros within the circuit design and that are normalized within each circuit design.

14. The non-transitory computer readable medium of claim 10 wherein the processing device estimates multiple quality metrics for each candidate macro placement, the multiple quality metrics including metrics for congestion, for timing and for power.

15. The non-transitory computer readable medium of claim 10 wherein the instructions further cause the processing device to:

rank the candidate macro placements based on the estimated quality metric.

16. A system comprising:

a memory storing instructions and a plurality of sets of source macro placements for different source circuit designs; and a processing device, coupled with the memory and to execute the instructions, the instructions when executed cause the processing device to:

develop a plurality of different machine learning-based pipelines to predict model-specific estimates of a quality metric for difference candidate macro placements for a target circuit design, wherein each machine learning-based pipeline includes a machine learning model trained on a different one of the sets of source macro placements; and develop a combination of the model-specific estimates, wherein the combining is based on an applicability of (a) the set of source macro placements for each model-specific estimate to (b) the set of candidate macro placements.

17. The system of claim 16 wherein the processing device develops a discerning ensemble of the different machine learning models.

18. The system of claim 16 wherein the instructions further cause the processing device to:

receive user input indicating whether the machine learning models are trained (x) using only the sets of source macro placements from other circuit designs; (y) also using macro placements of the target circuit design and corresponding pre-optimization values of the quality metric; or (z) also using macro placements of the target circuit design and corresponding post-optimization values of the quality metric.

19. The system of claim 16 wherein the instructions further cause the processing device to:

train the machine learning models using different ones of the sets of source macro placements augmented by macro placements from the target circuit design.

20. The system of claim 16 wherein the sets of source macro placements are generated by a physical design EDA application applied to the different circuit designs using a same set of configuration parameters for the different circuit designs.

* * * * *